Feb. 19, 1929.  E. M. ROSENBLUTH  1,702,918
HEATER FOR WATER COOLING APPARATUS OF MOTOR VEHICLES AND THE LIKE
Filed Jan. 21, 1927    2 Sheets-Sheet 1
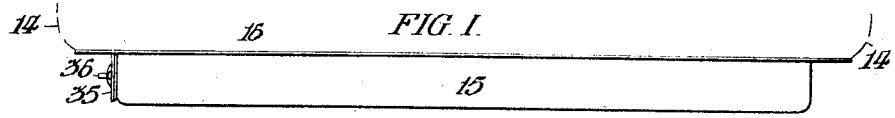
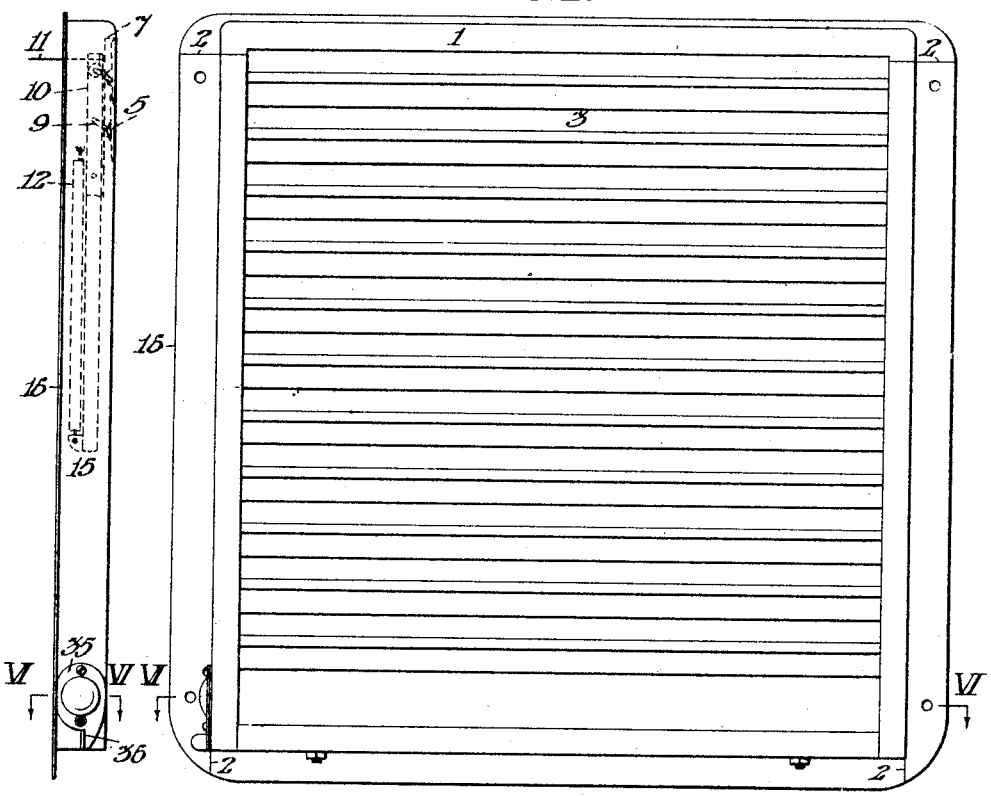
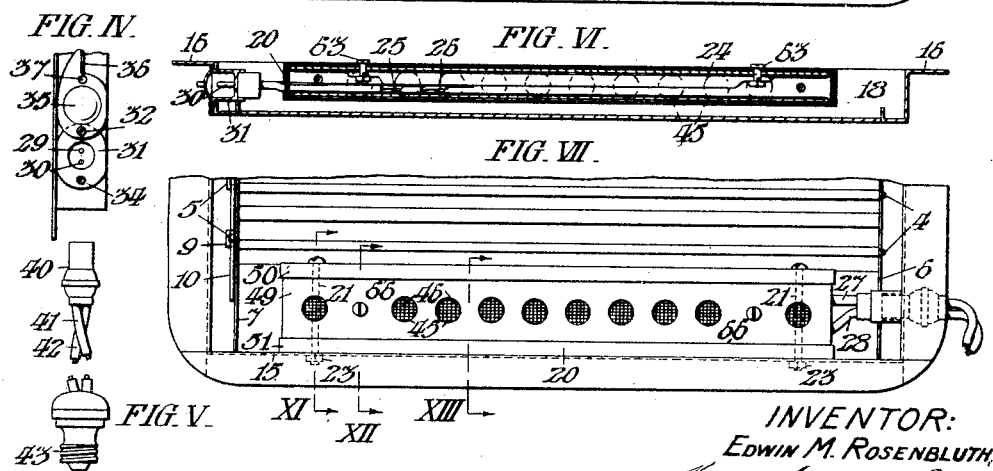
INVENTOR:
EDWIN M. ROSENBLUTH Feb. 19, 1929.  
E. M. ROSENBLUTH  
1,702,918  
HEATER FOR WATER COOLING APPARATUS OF MOTOR VEHICLES AND THE LIKE  
Filed Jan. 21, 1927   2 Sheets-Sheet 2
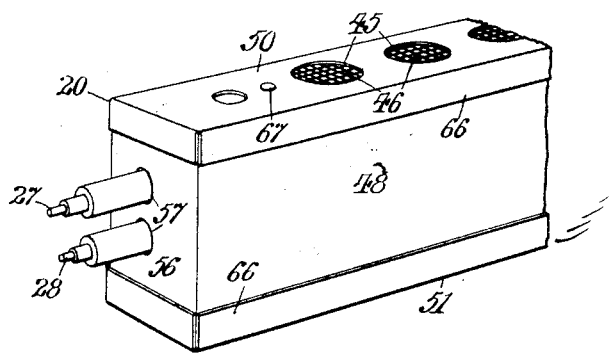
FIG VIII.
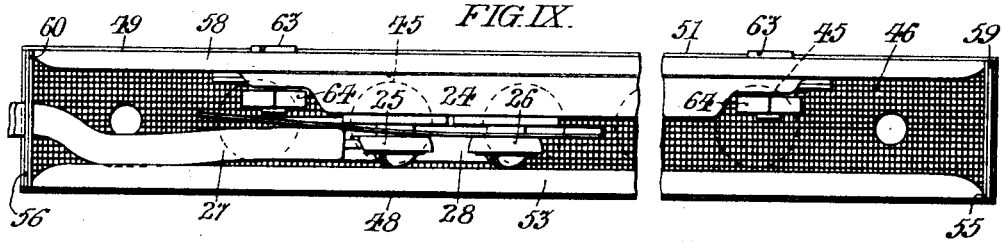
FIG IX.
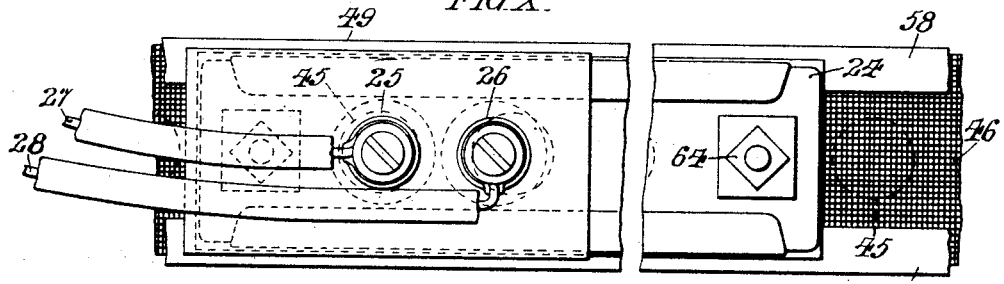
FIG X.
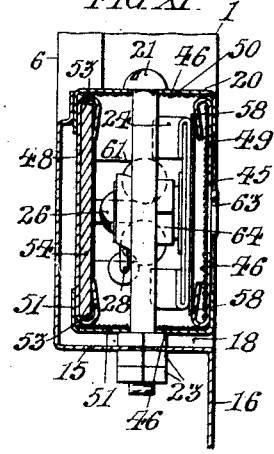
FIG XI.
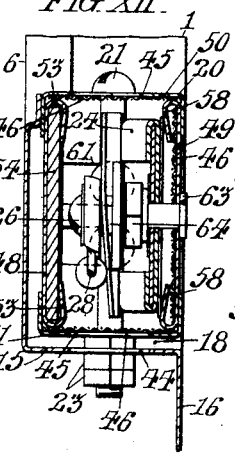
FIG XII. FIG XIII.
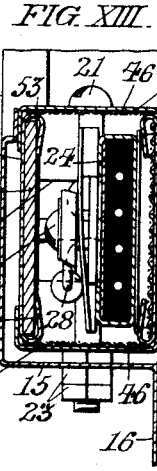
FIG XIV. FIG XV.
INVENTOR:  
EDWIN M. ROSENBLUTH Patented Feb. 19, 1929.

1,702,918

UNITED STATES PATENT OFFICE.

EDWIN M. ROSENBLUTH, OF WALLINGFORD, PENNSYLVANIA.

HEATER FOR WATER-COOLING APPARATUS OF MOTOR VEHICLES AND THE LIKE.

Application filed January 21, 1927. Serial No. 162,441.

My invention relates to heaters of the class contemplated in Letters Patent of the United States No. 1,121,266 granted December 15, 1914, of which I am the assignee, and No. 1,155,098 granted September 28, 1915 to me, to wit, a heater for warming the water in the radiator of a water circulating system of an internal combustion motor of a self-propelled vehicle; such heater being independent of such motor and employed to prevent freezing of the water in such system when the latter is exposed to winter temperatures.

As hereinafter described, my invention includes an electric heating unit mounted in a foraminous casing, arranged to permit the circulation of air to said heating unit through said casing, from the surrounding atmosphere, but arranged to prevent the ignition of any explosive atmosphere which may surround said casing. As hereinafter described, said casing is provided with means for rigidly securing it in a cover for an automobile radiator, which cover has a plug socket accessible from the exterior thereof and in electrical connection with said heating unit. Said socket is provided with a movable closure which normally secludes it from the weather. A flexible cable is provided with plugs at the opposite ends for detachable connection respectively with said socket in the radiator cover and with any ordinary incandescent lamp socket or similar electric receptacle for connection with an energizing circuit.

My invention includes the construction and arrangement of the casing for the heating unit which, as hereinafter described, may be formed of sheet metal stampings, and also includes the various novel features of construction and arrangement hereinafter more definitely specified.

In said drawings; Fig. I is a plan view of a radiator cover conveniently embodying my invention.

Fig. II is a front elevation of said cover.

Fig. III is an elevation of the left hand side of said cover, as seen in Figs. I and II, and with the socket closure in its normal position to seclude the socket.

Fig. IV is a fragmentary side elevation, similar to Fig. III, but showing the socket closure opened to permit the insertion of the conducting plug.

Fig. V is a side elevation of the cable for cooperation with the socket shown in Fig. IV.

Fig. VI is a plan sectional view, taken on the line VI, VI in Figs. II and III.

Fig. VII is a fragmentary rear elevation of said cover, showing means rigidly securing the heater casing therein.

Fig. VIII is a fragmentary perspective view of said heater casing, from the front thereof, at the left hand end of Fig. VI.

Fig. IX is a fragmentary plan view of said heater casing with the top wall section thereof removed.

Fig. X is a fragmentary front elevation of the rear wall section of said heater casing with the heater unit attached thereto.

Fig. XI is a fragmentary vertical sectional view taken on the line XI, XI in Fig. VII showing said heater casing and the adjacent portion of the radiator cover to which it is secured.

Fig. XII is a vertical sectional view of said heater casing, taken on the line XII, XII in Fig. VII.

Fig. XIII is a vertical sectional view of said casing, taken on the line XIII, XIII in Fig. VII.

Fig. XIV is a fragmentary vertical sectional view of a modified form of radiator cover inclosing such a heater as shown in the preceding figures.

Fig. XV is a fragmentary vertical sectional view of a modified form of radiator cover inclosing a modified form of heater.

Referring to Figs. I to XIII inclusive; the radiator cover includes a substantially rectangular frame 1 formed of four pressed sheet metal strips welded together at 2 and provided with a series of louvers 3 having trunnions 4 and 5 at respectively opposite ends thereof journaled in flanges 6 and 7 so that they may be tilted to and from contact with each other to close, or vary the extent of, the opening within said frame 1. Movement of said louvers may be conveniently effected by providing the trunnions 5 thereof with respective crank arms 9, indicated in Fig. VII, the ends of which are engaged with a common shifting bar 10 which may be pulled rearwardly by the connector 11 to tilt said louvers to more or less open position, against the tension of the spring 12.

To afford room for operation of said louvers between the outer face of said frame 1 and the radiator 14 covered by it; said frame 1 has webs 15 extending at right angles to its base flange 16 so as to form a chamber 18, best shown in Fig. VI.

Said chamber 18 incloses the heater casing 20 which rests upon the lower web 15 of said frame 1 and is rigidly secured thereto, as best shown in Figs. VII and XI, by two bolts 21 which extend through said casing 20 and web 15 and are engaged by nuts 23 beneath said web 15.

Said casing 20 incloses an electric heating unit 24 having terminals 25 and 26 respectively provided with conductors 27 and 28 leading to the terminals 29 and 30 in the plug socket 31 which is rigidly secured in said frame 1 by the screws 32 and 34. As indicated in Figs. III and IV; said screw 32 serves as a pivot for the movable closure 35 which normally secludes said socket from the weather when turned into the position shown in Fig. III, by means of its handle flange 36; in which position the hole 37 in said closure fits over the head of said screw 34, which thus normally detains it in the position shown in Fig. III. However, said closure may be upturned to the position shown in Fig. IV, for insertion of the plug 40 of the cable comprising the two conductors 41 and 42 which cable has, at its other end, the plug 43 for detachable connection with any ordinary incandescent lamp socket or similar electric receptacle having connection with a source of electric current, adapted to energize said heater.

As such heaters are frequently surrounded by an explosive atmosphere of air and gasoline vapor; it is not only highly desirable to prevent ignition of such atmosphere by the heater, but means for that purpose are authoritatively required. Therefore, although I provide said lower frame web 15 with a series of air inlet ports 44 and said casing 20 with a series of ports 45, through which atmospheric air may be circulated to convey the heat from the unit 24 to said radiator 14; I provide all said ports 45 with wire screens 46 of such character as to prevent ignition of any explosive atmosphere which may surround said casing 20.

As shown in Figs. VIII to XIII inclusive; I find it convenient to form said casing 20 of four primarily separate pieces forming respective wall members 48, 49, 50 and 51, which may be readily detachably connected or separated for access to and replacement of said unit 24. Said wall member 48 has opposite edge flanges 53 which are inwardly turned to hold the strip of heat insulating material 54, and has opposite end flanges 55 and 56, extending at right angles to its plane, to hold it in proper spaced relation with the wall member 49, which is turned toward the radiator and preferably in direct contact therewith. Said flange 56 has two, spaced, openings 57 through which said conductors 27 and 28 respectively extend. Such insulating means 54 minimize the loss of heat from said unit 20 outwardly through the outer wall of said radiator cover frame 1; and thus conserve the heat within said cover for application to the radiator. Said wall member 49 has inwardly turned edge flanges 58 holding the foraminous screen strip 46 over the series of ports 45 therein, and opposite end flanges 59 and 60, extending at right angles to its plane, to hold it in proper spaced relation with said wall member 48. Said flange 60 has slots 61 therein registering with said conductor openings 57 in said flange 56. Said heater unit 24 is detachably, but rigidly, connected with said wall member 49 by the bolts 63 which have slotted heads exterior to said casing 20 and are engaged with nuts 64 within said casing.

Said wall sections 50 and 51 are precisely alike, each having flanges 66 projecting at right angles from one face thereof to overlap the wall members 48 and 49 and retain the casing members in proper assembled relation. Each of said wall members 50 and 51 has a strip of foraminous screening 46 secured therein by rivets 67 to cover its ports 45.

It is to be understood that the construction and arrangement of said casing above described are such that the wall members 48, 49, 50 and 51 are rigidly secured in assembled relation by the bolts 21 which extend therethrough in connection with the bottom web 15 of the radiator cover 1, as above described.

Although I find it convenient to provide a heater in accordance with my invention in a radiator cover structure provided with adjustable louvers; I do not desire to limit the same to such an embodiment. For instance, in Fig. XIV, I have indicated a heater casing 20 such as above described, in a radiator cover 68 which differs from the cover 1 aforesaid in that the upper portion 69 thereof extends in closer relation with the front of the radiator 14 than is permissible with the louver construction.

Moreover, although I find it convenient to utilize heater units 24 of the flat form above described; it is to be understood that other forms may be employed. For instance, in Fig. XV, I have indicated a heating unit comprising a tubular ceramic core 70 upon which the heating element 71, to wit, a helical coil of nichrome wire, is wound and surrounded in spaced relation by the cylindrical casing 72, which is conveniently formed of the foraminous wire screening material indicated at 46 and having the capacity to prevent ignition of the surrounding atmosphere by the inclosed heating element which may become incandescent when energized, and which would otherwise ignite such atmosphere. In Fig. XV, I have shown said heating unit mounted within a radiator cover 74 which is of the character indicated in Fig. XIV, i. e., the lower portion thereof is offset outwardly to form a chamber 75 for the heater casing. However, it is to be understood that such a heater casing may be mounted in a radiator cover of the louver type shown in Fig. I.

However, it may be observed that the heater casing 20, having flat walls, is adapted to be mounted in direct metallic contact with the lower portion of the radiator 14 so as to directly transmit to the water in the radiator, the heat generated by the operation of the unit 24, and thus attain the maximum efficiency with a given expenditure of electric energy.

Therefore, I do not desire to limit myself to the precise details of construction and arrangement herein set forth, as it is obvious that various modifications may be made therein without departing from the essential features of my invention, as defined in the appended claims.

I claim:

1. The combination with an accessory variable louver shutter for an automobile radiator, having flanges with means for detachable engagement with such radiator; of an electric heater comprising an electrical heating unit having a closely fitting foraminous metallic casing extending transversely to said radiator, at the bottom of and upon the exterior of, said radiator, but in direct contact therewith; whereby the heat from said unit is transmitted directly to said radiator through a metallic path.

2. A structure as in claim 1, wherein the contacting surfaces of the radiator and heater casing are plane and separable.

3. A structure as in claim 1, wherein the heater casing is supported by means independent of, and removable with respect to, the radiator.

4. The combination with an accessory, variable, shutter for an automobile radiator, having means for detachable engagement with such radiator; including a cover for said radiator forming a chamber at the front of said radiator; and an electrically operative heater, in said chamber comprising a heating unit in a closely fitting metallic casing extending in said cover chamber transversely with respect to the radiator, at the lower portion of the latter; electric conductors extending from said heater to terminals at one side of said radiator cover; a socket recessed in said radiator cover surrounding said terminals, and accessible for insertion of a conducting plug from the outside of said cover; and a movable closure for said socket hinged to said radiator cover and arranged to normally seclude said terminals from the weather; whereby said heater may be temporarily detachably connected with an exterior source of electrical energy, to energize it, and the heat is transmitted from said unit to said radiator, through a metallic path.

5. The combination with an accessory automobile radiator cover, having means for detachable engagement with such radiator; of an electric heater within said cover; a socket recessed in said cover containing electric terminals for said heater; and a substantially weather-proof closure for said socket; and means pivotally securing said closure to said cover.

6. A structure as in claim 5, wherein the socket is rigidly connected with the cover by screws, and one of said screws forms a pivot for said closure, and another of said screws is arranged as a detent for normally detaining said closure in closed position, by engagement therewith.

7. The combination with a removable, accessory radiator cover having a base flange arranged for attachment to the front of the radiator; and webs extending transversely to said base flange, forming a chamber within said cover; the bottom one of said webs having air inlet ports; of an electric heater, comprising an electrical heating unit having a closely fitting casing adapted to extend transversely in said cover chamber and having air inlet ports, in the bottom thereof, arranged to cooperate with the ports in said cover; whereby heat is transmitted from said unit to said radiator directly through a metallic path but air is circulated through the casing thereof to also carry heat to said radiator.

8. A structure as in claim 7, wherein the cover has an opening provided with louvers, which are adjustable to vary the effective area of said opening and thereby determine and control the rate of flow of air through said ports.

9. The combination with a removable, accessory sheet metal cover for an automobile radiator; of a sheet metal casing for an electric heating unit, mounted within said cover; and heat insulating means, carried by said casing, interposed between said heating unit and said cover; whereby waste of the heat from said unit outwardly from said cover is minimized.

In testimony whereof, I have hereunto signed my name at Philadelphia, Pennsylvania, this twelfth day of January, 1927.

EDWIN M. ROSENBLUTH.